United States Patent [19]
Bremer-Masseus et al.

[11] Patent Number: 6,005,031
[45] Date of Patent: Dec. 21, 1999

[54] AQUEOUS MULTIPHASE DISPERSIONS FOR MULTICOLOR COATINGS

[75] Inventors: Sylvia Bremer-Masseus, Zaandam; Cornelis van der Kolk, Heemskerk; Marcel Weber, Haarlem; Johannes van Schie, Noordwijk, all of Netherlands

[73] Assignee: Sigma Coatings, B.V., Pays-Bas, Netherlands

[21] Appl. No.: 09/136,053

[22] Filed: Aug. 17, 1998

[51] Int. Cl.$^6$ .................... C09C 1/00; C09D 1/00
[52] U.S. Cl. .................... 524/55; 524/58; 524/404; 524/405; 524/445; 524/446; 524/447
[58] Field of Search ................ 524/55, 58, 404, 524/405, 445, 446, 447

[56] References Cited

U.S. PATENT DOCUMENTS

| | | | |
|---|---|---|---|
| 3,950,283 | 4/1976 | Sellars et al. | 260/17 R |
| 4,376,543 | 3/1983 | Sakagami | 277/237 R |

*Primary Examiner*—Nathan M. Nutter
*Attorney, Agent, or Firm*—Michael J. Caddell; M. Norwood Cheairs

[57] ABSTRACT

Aqueous multiphase dispersions for multicolor coatings are produced by a process essentially comprising the steps of:
- providing one or more emulsion paints;
- adding at least one linear colloid capable of being insolubilised by borate ions and at least one hydrophilic inorganic clay to said paints to form base paints;
- providing an aqueous medium containing at least one hydrophilic inorganic clay;
- adding said base paints into said aqueous medium;
- adding borate ions to said aqueous medium;
- adding at least one emulsified binder to said medium;

each of the emulsion paints having a different color.

It is preferred to use galactomannoglycans as colloid (most preferably guar gum) and synthetic clays (most preferably of the smectite or hectorite types).

18 Claims, No Drawings

AQUEOUS MULTIPHASE DISPERSIONS FOR MULTICOLOR COATINGS

This invention relates to paints, particularly multicoloured paints.

Multicoloured paints have long been commercially available; they consist of a dispersion of globules in a continuous medium. The term multicolour is used in the art because the globules and the continuous medium are generally coloured in such a way that the dry coating exhibits at least two colours; monocolour paints in which e.g. the globules would all have the same colour and the continuous medium would be clear are also comprised in the definition of multicolour paints as used herein.

A dry coating of a multicoloured paint generally exhibits one prominent colour with speckles, streaks or blotches of one or more additional colours, which can create a wallpaper-like appearance. In addition to being normally applicable at lower cost than wallpaper, multicoloured paints can be applied to substrates where it would be impossible or impractical to put wallpaper, such as irregular or rough surfaces, or exterior applications.

In general, the continuous medium is solvent-based: the water-solvent incompatibility keeps the various colours separated. For environmental reasons, there has however long been a desire for aqueous-based multicoloured paints.

GB-A-1286951 to HARLOW (=U.S. Pat. No. 3,950,283) discloses a process for the preparation of a multicoloured paint wherein at least two differently coloured aqueous film-forming polymer emulsions each containing polyvinyl alcohol are incorporated with an aqueous solution of a substance which insolubilizes polyvinyl alcohol so that a multicoloured paint dispersion is formed which comprises discrete differently coloured film-forming polymer emulsion particles as inner dispersed phases in the aqueous solution of the insolubilizing substance as outer continuous phase. As the substance which insolubilises the polyvinyl alcohol, there is disclosed the use of a borate solution having a pH greater than 7.

Thixotropic agents may be used, especially clays as described in GB-A-1054111 and GB-A-1155595.

U.S. Pat. No. 3,458,328 to ZOLA discloses aqueous multicolour coating compositions of two or more phases consisting of at least one dispersed phase consisting of discrete globules of an aqueous film-former and containing therein a hydrophilic colloid, which dispersed phase is dispersed in an aqueous dispersing medium. Also disclosed is a method of preparing said compositions, comprising adding to one another an aqueous flowable hydrophilic colloid film former containing a colorant and an aqueous flowable dispersing medium containing an insolubilising agent.

U.S. Pat. No. 4,376,654 to ZOLA discloses a method of producing dispersions of aqueous globules in an aqueous medium, wherein the aqueous phases are rendered insoluble or immiscible in one another by the presence in separate phases of colloidal ionic reactants, preferably macromolecular polyelectrolytes, which are opposite in charge. Solvent content can be reduced however without complete elimination.

The aqueous-based multicoloured paints of the prior art have at least one of two general deficiencies:
  the size distribution of the globules is irregular, giving an irregular pattern of the multicoloured coating, and/or
  the globules lack a sufficient resistance, which should be both mechanical (to resist mechanically during application) and chemical (to ensure total separation between colours).

Accordingly, it is an object of the invention to provide a process for preparing aqueous-based multicoloured paints in which the globules have a regular size distribution.

Another object of the invention is to provide a process for preparing aqueous-based multicoloured paints in which the globules are mechanically resistant to application under normal spraying conditions.

Yet another object of the invention is to provide a process for preparing aqueous-based multicoloured paints in which total colour separation is ensured between the globules.

As mentioned above, environmental concerns have prompted a need for solvent-free paints. Although aqueous-based paints contain less solvent than solvent-based paints, they usually still contain some solvent. Accordingly, there is a need in the art for aqueous-based multicolour paints which can be formulated solvent-free.

Thus, a further object of the invention is to provide a process for preparing aqueous-based multicolour paints in the composition of which no solvent needs to be used.

The process of the invention essentially comprises the steps of:
  providing one or more emulsion paints, each of the emulsion paints having a different colour;
  adding at least one linear colloid capable of being insolubilised by borate ions and at least one hydrophilic inorganic clay to each of said paints to form base paints;
  providing an aqueous medium containing at least one hydrophilic inorganic clay;
  successively adding said base paints, borate ions and at least one emulsified binder into said aqueous medium;
  recovering an aqueous multiphase dispersion.

Emulsion paints and emulsified binders are well-known in the art and need not be described herein. Exemplary textbook references are:
  Surface Coatings, vol. I, Oil and Colour Chemists' Association, Chapman and Hall, 1983: particularly
    16. Emulsion polymerization theory (pages 158–163)
    17. Emulsion properties 1: effect of monomer composition (164–170)
    18. Emulsion properties 2: effect of water phase and particle size (171–174)
    19. Emulsion properties 3: film formation (175–183)
    20. Emulsion polymers: manufacture and testing (184–193)
  Organic Coatings: Science and Technology, vol. I, chapter V, pages 64–82, Wicks Jones & Pappas, Wiley, 1992;
  Water-Borne Coatings, Dören Freitag & Stoye, Hanser, 1994. Exemplary patents are U.S. Pat. No. 4,968,741 and U.S. Pat. No. 5,122,566.

A wide range of emulsions can be used. Whilst none of the emulsions used may interfere in the formation mechanisms, this is particularly important for the further emulsified binder used in the continuous phase which may not interfere with the globule structure.

Linear colloids capable of being insolubilised by borate ions have long been known in the art (see e.g. U.S. Pat. No. 3,458,328). They comprise the galactomannoglycans, polyoxyethylenes and various copolymers of polyvinyl alcohol. Galactomannoglycans are preferred, and among them guar gum is most preferred.

Galactomannoglycans are well known in the art and need not be described herein (see e.g. Ullmann's Encyclopedia of Industrial Chemistry, vol. A25, pages 54–57, VCH Verlaggesellschaft, 1994; Encyclopedia of Polymer Science and Engineering, vol. 7 pages 597–599 and vol. 13 page 120, Wiley, 1987 and 1988); they comprise natural galactomannoglycans and their derivatives. Typical examples are locust bean gum (carob gum), tara gum and guar gum.

Hydrophilic inorganic clays which are particularly useful in the process of the invention are characterised by the tendency to swell by absorbing water between adjacent crystal layers, and to split into charged fragments capable of forming colloidal sols. Those clays have been denoted by various generic names as montmorillonites, montmorillonoids and smectites; this group includes the minerals montmorillonite, beidellite, saponite, stevensite, nontronite and hectorite.

Synthetic clays have been found particularly advantageous and are thus preferred. The most preferred clays are synthetic smectites and particularly hectorites.

The aqueous medium containing at least one hydrophilic inorganic clay is provided under the form of a colloidal clay dispersion (or "solution"). Its viscosity should preferably be lower than 27 s (DIN cup 3 according to DIN EN ISO 2431 standard), most preferably below 22 s.

The preparation of colloidal clay dispersions is generally facilitated by the use of water-soluble inorganic phosphates, and particularly tetrasodium pyrophosphate. The preferred grades contain about 5% of tetrasodium pyrophosphate (more preferably not over 10%).

Among the synthetic smectites, a preferred one is a hydrous sodium lithium magnesium silicate with a typical dry weight analysis of: $SiO_2$ 59.5%, MgO 27.5%, $Li_2O$ 0.8%, $Na_2O$ 2.8%, loss on ignition 8.2%; it is more preferred to use a grade thereof which in its dry state contains 4.1 wt % of $P_2O_5$.

Synthetic hectorites are described in GB-A-1054111, GB-A-1155595 and U.S. Pat. No. 4,049,780. A typical general formula is:

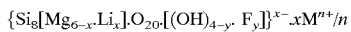

$$\{Si_8[Mg_{6-x}Li_x]O_{20}[(OH)_{4-y}F_y]\}^{x-}\cdot xM^{n+}/n$$

wherein M is a cation of valency n from 1 to 3, x is greater than 0 and less than 6, and y is from 1 to less than 4.

A hydrophilic inorganic clay is used in each phase; this is against a prejudice that has long been known in the art and according to which this would produce globules lacking the required properties.

Borate ions are preferably introduced by adding borax; they could alternatively be produced e.g. by the reaction of boric acid with a strong base such as sodium hydroxide, or by other known means.

Each and every one of the paint components is well known in the art. Whilst not wishing to be bound by a theory, it is believed that the core of the invention lies in the synergy between three specific mechanisms of formation of globules, namely:

(i) the mechanism based on the interaction of a hydrophilic clay with the linear colloid in the base paint;

(ii) the mechanism due to the presence of a hydrophilic clay in the continuous phase and in each of the dispersed phases; and (iii) the mechanism based on the reaction between the linear colloid and borate ions.

Still not wishing to be bound by a theory, it is believed that the above combination is essential to obtain stable coloured globules, i.e. coloured globules that neither shrink nor bleed (bleeding or colour migration occurs when a tinting pigment leaches from one phase, e.g. the globules, into another phase, e.g. the continuous phase). Apparently, the mechanism (i) would be responsible for a strong structural framework in the base paints, the mechanism (ii) would effectively fix the colours and separate them, and the mechanism (iii) would make the globules strong enough to resist during spraying.

The stability of the globules obtained by the process of the invention is such that the form, size and colour of the globules in the can are essentially unchanged by the spraying process. Thus, the invention has now made it possible to realise a uniform spray pattern on the substrate (particularly according to the impression received from the wet paint, a significant advantage to the painter).

At least one linear colloid capable of being insolubilised by borate ions (preferably one) and at least one hydrophilic inorganic clay (preferably one) must be added to each of the one or more emulsion paints to form one or more base paints (which will form the globules). The addition is usually performed in a dissolver, the galactomannoglycans when used as linear colloid being preferably added as a "solution" to accelerate the dissolution process. The amounts of said linear colloids and hydrophilic inorganic clays can vary widely, depending on the required properties of the multicolour paint; according to preferred embodiments, the total amount of said linear colloids in each base paint is of 0.5 to 2 wt % of the base paint (preferably 0.7 to 1 wt %) and the total amount of said clays in each base paint is of 0.4 to 1.5 wt % of the base paint (preferably 0.7 to 1 wt %).

The base paints may be coloured using pigments and dyes as usual in the art of emulsion paints; these are usually introduced as pastes or inks which may optionally further contain fillers and/or additives. The variety of effects that can be obtained accordingly is well-known in the art (see e.g. U.S. Pat. No. 4,376,654, col. 7, lines 1–32). Representative examples of pigments which can be used include inorganic pigments such as titanium dioxide, red iron oxide, yellow iron oxide, iron oxide black and metallic oxide brown, and organic pigments such as phthalocyanine blue and phthalocyanine green.

The base paints are introduced into an aqueous medium itself containing at least one hydrophilic clay in a total amount of from 0.5 to 7 wt % (preferably 1.0 to 5 wt %, most preferably 3.0 to 4.0 wt %) with respect to the aqueous medium as provided; alternately, the base paints can be introduced into an aqueous medium containing at least 0.5 wt %, preferably at least 1 wt %, of said hydrophilic clays while the remainder thereof is added after the base paints. Whilst the amount of base paints in multicolour paints can vary widely (at the very least from 40 to 60 wt %), the best designs are obtained with about 50 wt %.

The mixing steps are carried out using conventional mixing equipment. According to preferred embodiments of the process of the invention, dissolvers are used to prepare the base paints and/or mixers are used for the steps that follow.

According to the invention, each base paint is added in turn to the aqueous medium containing at least one hydrophilic inorganic clay. This embodiment can be carried out in several ways:

the aqueous medium contains the total amount of clay, each base paint being added in turn; or preferably the aqueous medium only contains a fraction of the total amount of clay, each base paint being added in turn, an additional amount of clay being added after some or each of the base paints.

The process of the invention then continues with the addition of borate ions and at least one emulsified binder.

Because of the above-mentioned globule stability, there is obtained a "what you see is what you get" effect when the continuous phase is transparent. It is however possible to use a non-transparent (e.g. translucent) emulsified binder or even an emulsion paint instead, without however obtaining said "what you see is what you get" effect.

To obtain a transparent continuous phase, it is essentially required that (i) the aqueous medium containing the hydrophilic inorganic clay(s), i.e. the colloidal clay dispersion, and (ii) the said at least one emulsified binder both be transparent.

The colloidal clay dispersion is transparent when the size of the fully hydrated and dispersed clay is sufficiently small, typically of the order of 0.025 mm (diameter)×1 nm (thickness).

As known in the art, an emulsified binder is translucent (or, better, transparent) when the size of the particles is sufficiently small, typically below 60 nm.

Using a translucent (or preferably a transparent) and colourless continuous phase has the additional advantage of allowing to obtain bright colours to be obtained.

Borate ions are added in an amount corresponding to 0.01 to 0.6 wt % of borax (preferably 0.02 to 0.3 wt %, more preferably 0.03 to 0.2 wt %, most preferably about 0.1 wt %) with respect to the multicolour paint.

In addition to any additives introduced as components of the emulsion paints or emulsified binder, one or more further additives may optionally be introduced into the said aqueous medium containing at least one hydrophilic inorganic clay, at any time up to the end of the process of the invention. Exemplary additives that may be used are stabilisers, can preservatives, fungicides and bactericides. Stabilisers are chemical agents which neutralise the effects of light. Can preservatives are chemical agents which prevent rust formation on the inside of steel cans. Fungicides are chemical agents which prevent fungus growth in the aqueous multiphase dispersion or in the dry multicolour coating prepared therewith. Bactericides are chemical agents which prevent bacterial growth in the aqueous multiphase dispersion.

It is possible to formulate solvent-free compositions (as defined by the ASTM D-3271-87 standard method) as no solvent is necessary in the process of the invention. Care must then be taken to use solvent-free emulsified binders, additive compositions and inks. Care must also be taken to ensure complete dissolution of macromolecular components which would otherwise have been added as solutions in organic solvents.

The compositions obtained by the process of the invention can be applied as usual in the art of multicolour paints; it is known in the art that the viscosity and the thixotropy of the paint have to be adapted to the method of application.

It is thus possible, though not preferred, to use a brush, pad or roller to apply the paints obtained by the process of the invention, thereby obtaining effects resulting from the directional shear and/or geometrical configuration of the application tool.

The preferred method is spraying, most preferably conventional air spray (Chapter III, pages 19–23, in "Application of paints and coatings", S. Levinson, Federation of Societies for Coatings Technology, 1988). When spraying the paints obtained by the process of the invention, the increased cohesion of the globules results in their appearing in a uniform spaced relationship in the coating.

It has further surprisingly been found that the addition of a small amount of a salt of a low molecular weight anionic polysaccharide to finished aqueous multicolour paints has a favourable effect on their stability. The preferred features of said salt are independently or in any combination (i) an amount of at least 0.01 wt % (with respect to the multicolour paint), preferably of about 0.1 wt %, most preferably up to 0.2 wt %, (ii) sodium salt, (iii) carboxymethylated polysaccharide, (iv) cellulose as polysaccharide and (v) a weight average molecular weight of 1,000 to 20,000 or slightly above (most preferably Mw of about 10,000). The effect is obtained even when the finished aqueous multicolour paint already contains a salt of an anionic polysaccharide of high molecular weight.

Alternate embodiments of the invention are obvious to those of ordinary skill in the art. For example, it is possible to use an embodiment wherein each base paint is added to a separate fraction of the said aqueous medium; the separate mixtures are then either combined, the process of the invention then continuing with the addition of borate ions and a further emulsified binder, or kept separate for the addition of borate ions then combined, the process of the invention then continuing with the addition of a further emulsified binder, or even kept separate for the addition of borate ions and a further emulsified binder then combined.

EXAMPLE

In the example, figures are given in parts by weight (pbw) unless otherwise specified. The operating temperature was 20° C. unless obviously different or otherwise specified.

When required for storage, about 0.3 wt % of biocide/fungicide was added to all aqueous solutions.

Preparation of the Emulsified Binders

The reactants were emulsified in the larger part of the water. A portion of the emulsion was mixed with the remainder of the water and heated while stirring until the internal temperature reached about 80° C. The mixture began to reflux, while the temperature rose indicating polymerisation. The remainder of the emulsion was added progressively when the refluxing subsided. After the addition was complete, the mixture was heated to about 97° C. to complete the polymerisation. It was then cooled to about 60° C. before adding the reinitiating system. The resulting emulsified binder was then cooled to room temperature and strained.

Preparation of the Base Paints

Water was introduced in a stainless steel dissolver. The following components were introduced in the indicated order, caution being taken to completely dissolve or disperse each component before adding the next one:

sodium hydroxide;

additives;

fillers;

titanium dioxide (if required);

guar gum solution (prepared in a separate vessel);

emulsified binder (prepared as mentioned above);

Laponite™ RDS dispersion (10 wt % in water, prepared in a separate vessel).

The resulting dispersion was left overnight.

If desired, the dispersion was then coloured by adding a coloured ink, i.e. a pigment paste without binder.

Preparation of Coloured Paints

The method of preparation is described in each example.

The resulting paints were stored at room temperature.

Paint and Coating Properties

The paints were applied using conventional air spraying techniques; the apparatus was an Optimaset H.V.L.P. sprayer with a 2.5 mm nozzle and a 3.0 mm cap, using an air pressure of 0.075 MPa and a pressure of 0.17 MPa on the paint container. The spraying characteristics (particularly the spraying rate) were evaluated.

The dry coatings were tested for washability and scrubbability according to the DIN 53778 Part 2 standard method.

The coatings were also evaluated visually for the following characteristics:
- conformity of the colours, particularly of white parts;
- clear separation between colours;
- form of each colour patch;
- regularity of the pattern.

Example 1

Emulsified binder A:

| | | |
|---|---|---|
| water | 50 | |
| butyl acrylate | 24 | |
| styrene | | 22 |
| acrylic acid | 1 | |
| acrylamide | 0.4 | |
| surfactants | 1.4 | |
| potassium persulphate | 0.2 | |
| reinitiating system | 0.1 | |
| ammonia (25%) | | 0.5 |
| additives | 0.4 | |

Emulsified binder B:

| | | |
|---|---|---|
| water | | 65 |
| butyl acrylate | | 20 |
| styrene | | 9 |
| methacrylic acid | | 1.5 |
| acrylamide | 0.2 | |
| surfactants | 3 | |
| potassium persulphate | 0.1 | |
| reinitiating system | 0.1 | |
| ammonia (20%) | | 0.8 |
| additives | 0.3 | |

White base paint:

| | | |
|---|---|---|
| water | | 36.7 |
| additives | 2 | |
| sodium hydroxide | | 0.05 |
| titanium dioxide | | 20 |
| silica filler | 2.5 | |
| guar gum solution | | 2.75 (0.75 pbw in propylene glycol) |
| emulsified binder A | 28 | |
| Laponite ™ dispersion | 8 | (0.8 pbw in water) |

Inks (pigment pastes):

red-brown:

| | | |
|---|---|---|
| red oxide | 61.5 | |
| glycols | | 17.5 |
| water | | 9.5 |
| additives | 10 | |
| fillers | | 1.5 | yellow:

| | | |
|---|---|---|
| yellow iron oxide | | 56 |
| glycols | | 15 |
| water | | 16 |
| additives | 10 | |
| fillers | | 3 | black:

| | | |
|---|---|---|
| black pigment | | 8.5 |
| glycols | | 26 |
| water | | 22 |
| additives | 14.3 | |
| fillers | | 29.2 | light black:

| | | |
|---|---|---|
| black pigment | | 1.6 |
| glycols | | 32 |
| water | | 18.1 |
| additives | 14.3 | |
| fillers | | 34 |

Grey base paint:

| | | |
|---|---|---|
| white base paint | | 98.2 |
| yellow ink | 0.9 | |
| black ink | 0.8 | |
| red-brown ink | | 0.1 |

Salmon base paint:

| | | |
|---|---|---|
| white base paint | | 99.5 |
| yellow ink | 0.4 | |
| red-brown ink | | 0.05 |
| light black ink | | 0.05 |

Preparation of multicoloured paints

The following components were introduced in a stainless steel mixer, in the indicated order, while continuously stirring:

| | | |
|---|---|---|
| water | | 19.2 |
| Laponite ™ RDS dispersion | 3 | (0.3 pbw in water) |
| grey base paint | | 3.7 |
| Laponite ™ RDS dispersion | 1 | (0.1 pbw in water) |
| salmon base paint | | 6.6 |
| Laponite ™ RDS dispersion | | 6.8 (0.68 pbw in water) |
| white base paint | | 39.7 |
| Laponite ™ RDS dispersion | | 7.2 (0.72 pbw in water) |
| borax solution | | 3 (0.03 pbw borax in water) |
| emulsified binder B | 5 | |
| sodium carboxymethylcellulose (Mw about 10,000) | 3 | (0.18 pbw NaCMC in water) |
| water | | 1 |
| additives | 0.8 | |

The resulting paint had a density of 1.09 g/mL, a viscosity of 158.6 dPa.s (Brookfield spindle 2 on a Haake VT181 viscosimeter, speed 32) or 8.3 (spindle 2, speed 1).

Spraying:

The multicolour paint was diluted by adding 10 pbw of water to 100 pbw of paint, then sprayed. The flow rate was of about 1.1 kg/min and the coverage of about 3.2 m2/L, corresponding to about 27 s/m2. The wet hiding power was good.

Properties of the Dry Coating:

The dry coating passed the DIN 53778 part 2 standard test for washability and scrubbability. The dry hiding power was good. The motive of the dry coating was regular, the colour patches were substantially circular and the colours were conform to the original colours and well separated.

What is claimed is:

1. A Process for preparing aqueous multiphase dispersions comprising the steps of:
   providing at least two emulsion paints, each of said emulsion paints having a different colour;
   adding at least one linear colloid capable of being insolubilised by borate ions and at least one hydrophilic inorganic clay to each of said emulsion paints to form base paints;
   providing an aqueous medium containing at least one hydrophilic inorganic clay;
   successively adding said base paints, borate ions and at least one emulsified binder into said aqueous medium;
   recovering an aqueous multiphase dispersion.

2. The process according to claim 1, wherein the linear colloid capable of being insolubilised by borate ions is a galactomannoglycan.

3. The process of claim 2 wherein the linear colloid capable of being insolubilized is a guar gum.

4. The process according to claim 1, wherein the hydrophilic inorganic clay is a synthetic clay.

5. The process according to claim 4 wherein the hydrophilic inorganic clay is a synthetic hectorite.

6. The process according to claim 1, wherein the total amount of linear colloids in each base paint is of from 0.5 to 2 weight percent of the base paint.

7. The process according to claim 1, wherein the total amount of clays in each base paint is from 0.4 to 1.5 weight percent of the base paint.

8. The Process according to claim 1, wherein the total amount of clays in said aqueous medium comprises from 0.6 to 3 weight percent of the multicolour paint.

9. The process according to claim 8 wherein the total amount of clays in said aqueous medium comprises from 1 to 2 weight percent of the multicolour paint.

10. The process according to claim 1, wherein each base paint is added in turn to the whole of the aqueous medium containing at least part of said at least one hydrophilic inorganic clay.

11. The Process according to claim 10, wherein the aqueous medium contains the total amount of clay, each base paint being added in turn.

12. The process according to claim 10, wherein the aqueous medium only contains a fraction of the total amount of clay, each base paint being added in turn, an additional amount of clay being added after at least one of the base paints has been added.

13. The process according to claim 1, wherein each base paint is added to a separate fraction of the aqueous medium.

14. The process according to claim 1, wherein the borate ions are introduced through the addition of borax.

15. The process according to claim 1, wherein the total amount of borate ions is of from 0.1 to 2 wt % (calculated as borax) of the multiphase dispersion.

16. The process according to any one of the preceding claims, comprising the further step of adding a small amount of a salt of a low molecular weight anionic polysaccharide.

17. The process according to claim 16, wherein said step consists in adding from 0.01 to 0.2 wt % (with respect to the total composition) of sodiumcarboxymethylcellulose having a weight average molecular weight of from 1,000 to 20,000.

18. The process according to claim 17, wherein the composition is solvent-free as defined by ASTM D3271-87.

* * * * *